US006002756A

United States Patent [19]
Lo et al.

[11] Patent Number: 6,002,756
[45] Date of Patent: Dec. 14, 1999

[54] METHOD AND SYSTEM FOR IMPLEMENTING INTELLIGENT TELECOMMUNICATION SERVICES UTILIZING SELF-SUSTAINING, FAULT-TOLERANT OBJECT ORIENTED ARCHITECTURE

[75] Inventors: Ron Lo, Holmdel; Om Prakash Mahajan, Ocean; Christos I. Vaios, Shrewsbury; Eldred James Visser, Annandale, all of N.J.

[73] Assignee: AT&T Corp, New York, N.Y.

[21] Appl. No.: 08/844,424

[22] Filed: Apr. 18, 1997

[51] Int. Cl.$^6$ ............................................. H04M 3/42
[52] U.S. Cl. ........................... 379/201; 379/220; 379/265
[58] Field of Search ..................................... 379/114, 127, 379/201, 207, 220, 265

[56] References Cited

U.S. PATENT DOCUMENTS

| | | | |
|---|---|---|---|
| 5,311,572 | 5/1994 | Friedes et al. ............................. | 379/67 |
| 5,333,185 | 7/1994 | Burke et al. ............................. | 379/127 |
| 5,481,603 | 1/1996 | Gutierrez et al. ....................... | 379/221 |
| 5,506,894 | 4/1996 | Billings et al. ......................... | 379/127 |
| 5,515,425 | 5/1996 | Penzias et al. .......................... | 379/114 |
| 5,517,564 | 5/1996 | Slater et al. ............................. | 379/229 |
| 5,519,770 | 5/1996 | Stein ....................................... | 379/201 |
| 5,553,130 | 9/1996 | Turner .................................... | 379/220 |
| 5,864,614 | 1/1999 | Farris et al. ............................. | 379/207 |

*Primary Examiner*—Scott Wolinsky
*Assistant Examiner*—Bing Bui

[57] ABSTRACT

A set of multidimensional capabilities allows service-related data to be exchanged among and operate with different hardware platforms and software programs. A trigger based on the call request is received at a switching platform. The trigger activates a service-specific object driver. The object driver is built by interacting with service objects. Once the object driver is built, the service objects are executed with call processing information based on the newly built object driver. During the entire process, network management functions are executed in a fault-tolerant fashion to ensure reliability.

29 Claims, 4 Drawing Sheets

METHOD AND SYSTEM FOR IMPLEMENTING INTELLIGENT TELECOMMUNICATION SERVICES UTILIZING SELF-SUSTAINING, FAULT-TOLERANT OBJECT ORIENTED ARCHITECTURE

CROSS-REFERENCE TO A RELATED PATENT APPLICATION

This patent application is related to a commonly assigned U.S. patent application entitled METHOD AND APPARATUS FOR PROVIDING A MULTI-NETWORK GLOBAL VIRTUAL TRANSIT SERVICE, Ser. No. 08/844,425, filed Apr. 18, 1997, by the same inventors.

FIELD OF THE INVENTION

The present invention relates to implementing intelligent telecommunication services. More specifically, the present invention relates to a method for implementing self-sustaining, fault-tolerant object driver software within a telecommunications network.

BACKGROUND

Current advanced telecommunication services are composed of huge program instructions that are disjointedly distributed across various telecommunication platforms. The ever increasing end-user demand for intelligent services has forced the telecommunication providers to rapidly offer intelligent services that have resulted in complex, costly, and inflexible software architectures. These current software architectures are driven by individual service needs and quite often a number of capabilities are duplicated across multiple services. Furthermore, these current complex software architectures can introduce a subtle, unwarranted interaction between different services. Elaborate testing must be undertaken to ensure that a new service does not adversely affect existing services.

Consequently, these service program instructions suffer several shortcomings. They are difficult to maintain while a call is active, difficult to port onto a new platform and costly to develop. Offering customers bundled services is very difficult due to the lack of correlation of capabilities across various platforms. Furthermore, also due to the lack of correlation, as several services are to be activated for a given call, the service program instruction sets can only be performed consecutively, rather than simultaneously. Thus, they consume an enormous amount of the real-time and memory resources of the actual network elements, i.e., switches, databases, etc. Consequently, these telecommunication services are very complex and inflexible, and customers are forced to buy stand alone service offerings.

SUMMARY OF THE INVENTION

The present invention relates to a method for implementing intelligent telecommunication services by utilizing modular, self-sustaining, fault-tolerate object driver software.

The present invention allows software for telecommunication services to be modified easier without the risk of adversely affecting existing services, reused among different physical locations, and developed faster to reduce the time of bringing new products to market. Thus, the present invention provides improved reliability and flexibility.

The present invention implements intelligent telecommunication services between a calling party making a call request and a called party, within a telecommunication network. The present invention receives a trigger based on the call request from a source. The trigger activates a service-specific object driver. The object driver is built by interacting with service objects. Once the object driver is built, the call is formatted with call processing information based on the newly built object driver. During the entire process, network management functions are executed in a fault-tolerant fashion to ensure reliability. Once the call is formatted, the call can be forwarded to a next switching platform based on the call processing information. The present invention can be performed by a database or by at least one network element.

The network management functions can identify and recover an object driver not received. The network management functions can monitor several service objects simultaneously and more than once. The network management functions can also include generic network management of call recovery.

The trigger actuating a service-specific object driver can be initiated by the source or by the network. The object driver can be built from many service objects simultaneously.

DETAILED DESCRIPTION

The following terms, commonly known to those of ordinary skill in the art, are discussed throughout the detailed description and are provided here in glossary form for convenience.
BB: Broadband
CdPN: Called Party Number
CgPN: Calling Party Number
CXR ID: Carrier ID
FAI: Foreign Administration ID
GUG: GVNS User Group
GVNS: Global Virtual Network Service
ISDN: Integrated Services Digital Network
OPSP: Originating Participating Service Provider
POTS: Plain Old Telephone Service
RDB: Routing Data Block
SI: Service ID
TNRN: Terminating Network Routing Number
TPSP: Terminating Participating Service Provider
UCC: Unassigned Country Code
VPN: Virtual Private Network
WZ1: World Zone 1

Figure 1:
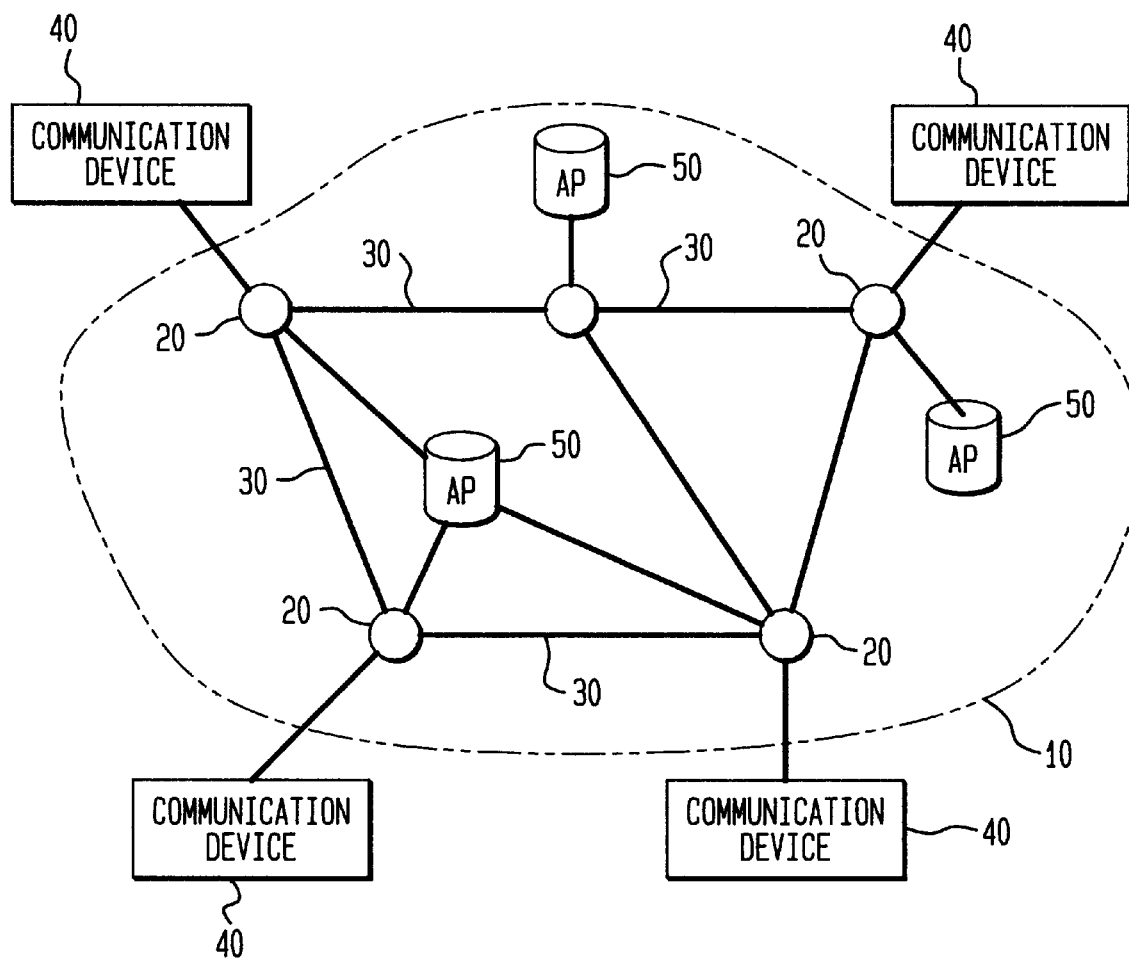
FIG. 1 illustrates the configuration and operation of a contemporary telecommunications network.

FIG. 1 illustrates the configuration and operation of a contemporary telecommunication network. Network 10 comprises a plurality of switching platforms 20 and links 30. Each of the switching platforms 20 also is connected to at least one adjunct platform 50. An adjunct platform can be connected to a single switching platform, or can be shared by two or more switching platforms or databases. Note that the depiction of a network comprising only five switching platforms is for convenience of illustration; an operating network can have a much larger number of switching platforms and associated connecting links. Similarly, although FIG. 1 shows a specific arrangement of adjunct platforms and switching platforms, any number of arrangements are possible.

Various switching platforms are shown illustratively connected to communications devices 40. It should be understood that the individual communications devices shown connected to the switching platforms in the figure are used for simplicity of illustration, and that an actual implementation of such a network would ordinarily have a number of communications devices connected at such switching platforms. Note, as well, that the communications devices shown in FIG. 1 can also represent another network or network devices, such as a LEC or PBX, which is connected to network 10.

Each communications device 40 can generate information for use by, or receive information from, other communications devices in the network. The term "information" as used herein is intended to include text, graphics, voice, and/or video. Communications device 40 also transmit call request data that can identify the source, the destination and other data related to services available to manage the call.

Figure 2:
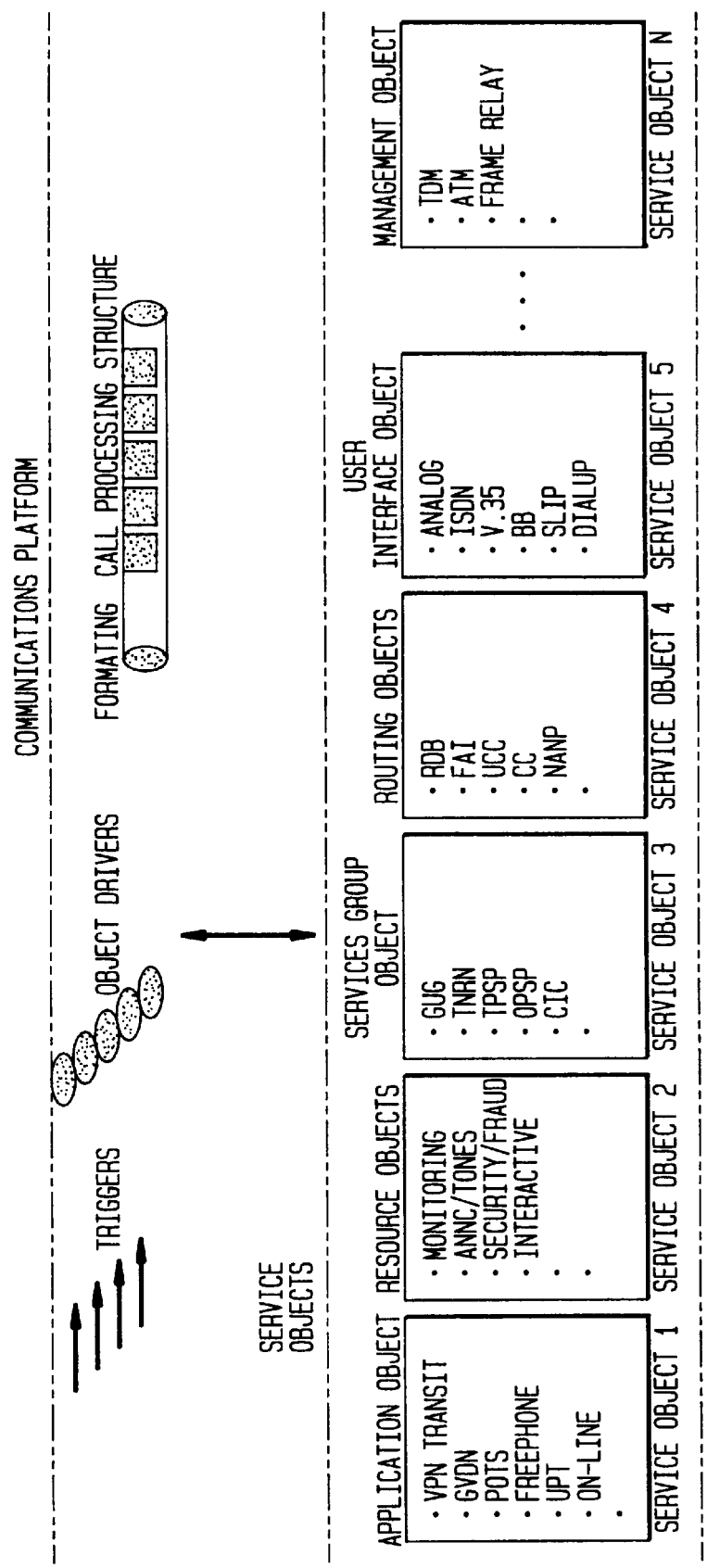
FIG. 2 illustrates a services functional model according to an embodiment of the present invention.
Figure 3:
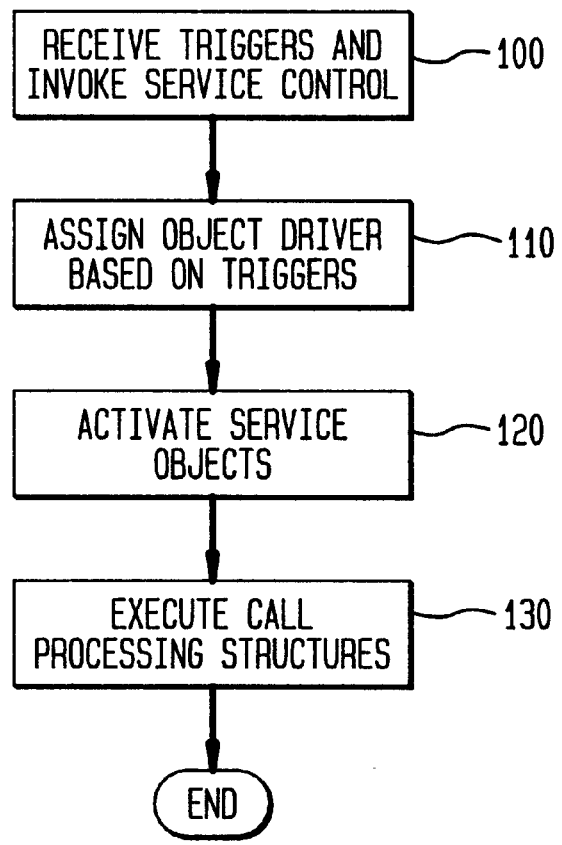
FIG. 3 shows a flowchart of a process according to an embodiment of the present invention.

The present invention illustrated in FIG. 2, introduces a set of multidimensional capabilities which allow service-related data to be exchanged among and operate with different hardware platforms and software programs. FIG. 3 shows a flowchart of a process according to an embodiment of the present invention; Table 1 summarizes the functional components of the present invention and non-exhaustively lists the elements associated with each functional component.

TABLE 1

| Triggers | Object Drivers | Service Objects | Call Processing Structures |
|---|---|---|---|
| CdPN | Service ID (SI) | Application Resources | Application-specific protocols |
| CgPN | Service | Services | Messages |
| CXR ID | Group ID | Group | Parameters/II |
| *288 | Data Rates | Routing | Service-specific |
|  |  | User Interface | protocols |
|  |  | Network | Messages |
|  |  | Transport | Parameters/I |
|  |  | Management |  |

The process begins at step 100 when a call request is received by a switching platform 20. Several elements of the call request can be used by a switching platform 20 as triggers to prompt the switching platform to take specific actions. Triggers are instructions or application service elements that direct a switching platform to suspend basic call processing control and invoke the service logic control. For example, the source's number or Calling Party Number (CgPN) can be used as a trigger. The first column of Table 1 lists other possible parameters that can be used as triggers. Triggers can prompt specific actions by the switching platform 20 during call setup or while a call is already established and the source or the network wants to perform a new action (e.g., a sequence call).

A combination of one or more triggers, either network specific and/or user specific, can be used to prompt a specific action by the switching platform 20. For example, the Called Party Number (CdPN) and the Calling Party Number (CgPN) have the unique characteristics of a public or customized dialing plan sequence and can meet the criteria for a trigger. The CdPN may be different from the user dialed number (DN), therefore accommodating instructions from database dips. Similarly, the CgPN can be different than the Automatic Number Identification (ANI) but the same as the billing number (BN), therefore the call can be billed properly. Similarly, when a call is already active, a trigger like *288 (*ATT) could be perceived as a network trigger, which means the user wants to go back to the network functions for additional capabilities or communication, e.g., third party calling.

Upon recognition of the type of action needed based upon the trigger, the process continues to step 110. At step 110 the switching platform 20 assigns a specific object driver for the call. Object drivers are service-specific application elements that can dynamically invoke specific service objects as will be discussed below. All object drivers have the unique capability to control all call functions in a multitasking fashion when an application is executed. For example, an object driver can communicate with the user or network at any point during the processing of a call without necessarily interrupting the service logic, e.g., call transfer, call sequence or third party call control. The second column of Table 1 lists some possible object drivers.

If the trigger is initiated by the user, the assigned object driver will look for specific capabilities to which the user has subscribed and try to correlate the necessary information before continuing to step 120, the next step in the process. If the switching platform 20 cannot recognize the user or the call, it can assign a "pseudo object driver" and all the information is correlated and the user's request is categorized. Then, for network purposes, the "pseudo object driver" can be overwritten for easier processing of the call (e.g., bill the call to the right system).

Once the appropriate object driver has been assigned in step 110, the process proceeds to step 120. At step 120, service objects are activated based on the contents of the object driver assigned in step 110. Service objects are sets of service-specific instructions that define the call processing segments of a call. A service object can exist for each type of network function; see, for example, the third column of Table 1. Table 2 non-exhaustively illustrates several service objects organized by function: Application, Resource, Service Group, Routing, User Interface, Network Transport Type, and Management. Table 2 also illustrates several members of each illustrated service object.

TABLE 2

| Appl. | Resource | Service Group | Routing | User Interface | Network Transport | Mngt. |
|---|---|---|---|---|---|---|
| VPN | Monitoring | GUG | RDB | Analog/ | TDM |  |
| Transit | Annc/Tones | TNRN | FAI | POTS | ATM |  |
| GVNS | Security/ | TPSP | UCC | ISDN | Frame |  |
| POTS | Fraud | OPSP | CC | V.35 | Relay |  |
| Free-phone | Interactive | CIC | NANP | BB |  |  |
| UPT |  |  |  | SLIP |  |  |
| On-line |  |  |  | Dialup |  |  |

Service objects can interact/exchange information with each other to create the correct call processing segments, consistent with user-subscribed capabilities and the available network resources. Some of these instructions could be used as unique "pointers" to drive a chain of call processing segments. These pointers (e.g., a country code) could derive both user and network instructions for a particular call. The collection of these service objects can then assist in forming the appropriate communication agents or call processing structures, as will be described below in connection with step 130.

The Management service object ensures proper handling of the other service object drivers; in other words, the Management service object provides the needed reports, responds to failures by communicating with the user and with the network call maintenance systems (OA&M). The Management service object detects the occurrence of any possible errors when building each object driver. The management service object can check multiple times during the processing of the other service objects, even though all of the service objects are being processed simultaneously. If an error occurs during processing of one of the other service objects, the Management service object can recover from the error by reinitiating the processing, rather than allowing the call to fail. This recovery can occur at all call levels including when the switching platform is prompted by a trigger, when the object driver is being built, when the service object drivers are being executed or even when the call processing information is being formatted.

Once all service objects are determined in step 120, the process proceeds to step 130. At step 130 switching platform 20 must identify and execute call processing structures. Call processing structures are stored program instructions responsible for initiating a "call session" that manages the association of interconnections in various media, based on specific service object instructions. Once the call processing structures have been identified, a communication software module resident at switching platform 20 provides the necessary network-specific instructions (internal and external) on how to execute the call processing structures. In other words, the communication module builds and then processes the necessary protocol structure that incorporates the instructions from the service object's call processing segments. This includes instructions to add or delete information based on the required interworking functions between networks/elements (e.g., switch to database, switch to adjunct/peripheral or switch to switch) and to form the correct signaling messages and information elements (e.g., Call Setup Message). The fourth column of Table 2 shows possible types of protocol structures for the call processing structures.

Once the call processing structures are identified and executed, the switching platform 20 has to format all the data according to the required protocol. The switching platform 20 builds the appropriate primitives for the external communications protocol and forwards the information to the next element or network.

The software associated with the functional components of the present invention can physically reside across various elements in a telecommunications network, i.e., switches, databases, and peripherals/adjuncts. Alternatively, the functional components of the present invention can be integrated into one network element, e.g., a database.

Figure 4:
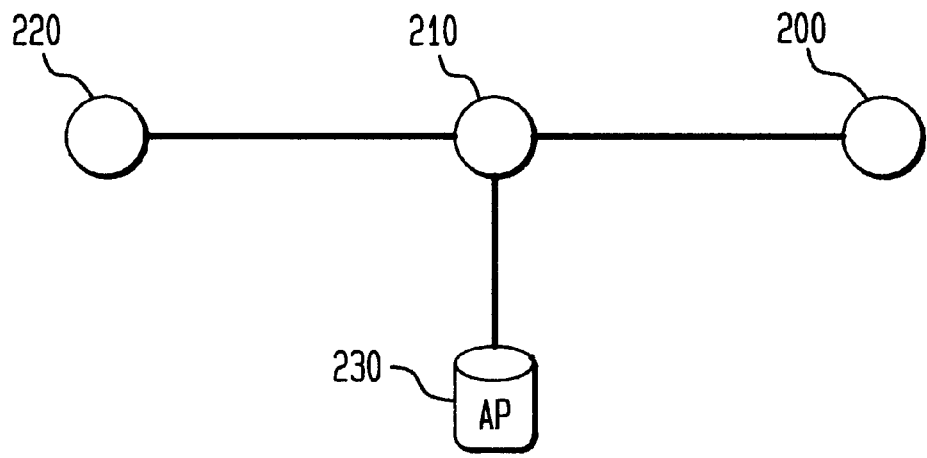
FIG. 4 shows a network configuration for a VPN transit service according to an embodiment of the present invention.

For illustrative purposes, the following example briefly describes how the present invention can implement a specific telecommunication service: a VPN transit service call from U.K. to Japan, via AT&T's domestic network. FIG. 4 shows a network configuration through which a call utilizing the VPN transit service can flow according to an embodiment of the present invention. Switching platform 200, a gateway switch located in the U.K., is connected to switching platform 210, a AT&T gateway switch. Switching platform 210 is connected to switching platform 220, a gateway switch located in Japan, and to an adjunct platform 230. The connections between the switching platforms can be through public facilities or dedicated facilities. Although FIG. 4 shows only a few network elements for convenience of illustration, any number of additional network elements can be present.

In this example, the AT&T gateway switching platform 210 receives a transit call via a CCITT #7 ISUP signaling message. Because this call is intended to be a VPN transit call, the incoming signaling message includes the network destination code (CXR ID) which identifies the terminating service provider. In this example, the CXR ID would refer to a terminating service provider in Japan.

Figure 5:
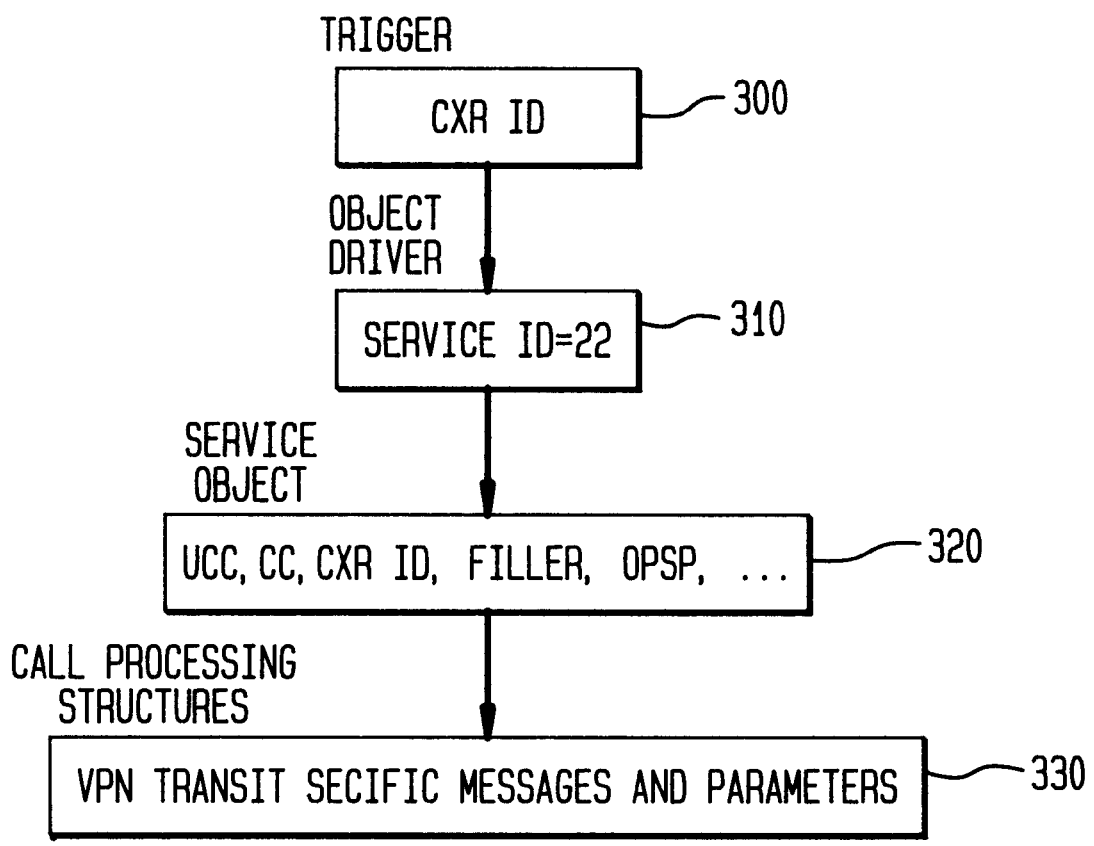
FIG. 5 illustrates the functional components of the present invention for the VPN transit service of FIG. 4.

FIG. 5 illustrates the functional components of the present invention as the VPN transit service call of FIG. 4 is implemented. The switching platform 210 recognizes the CXR ID as a trigger 300 and then assigns an object driver 310; in this example the service ID object driver 310 is assigned the specific value of 22. Switching platform 210 accesses adjunct platform 230 to build the service ID object driver 310 from the appropriate service objects 320. In this example, a service ID object driver 310 having a value of 22 is associated with a specific application service object 320, in this case VPN transit. The service ID object driver 310 is also associated with other service objects 320. For example, the service ID object driver 310 can be associated with user interface service objects, such as POTS; resources service objects, such as call monitoring and customized announcements; and service group service objects, such as GUG. Other service objects can also be used to process the call from a network perspective including routing, network transport, and perhaps billing recording among others.

Switching platform 210 executes the service objects 320. It can use specific pointers, such as "routing codes" within a routing table to speed the execution process, as illustrated in Table 3. A routing code be used to obtain the complete information needed to construct the call processing structure 330.

As illustrated in Table 3, the switching platform 210 can use a routing code to generate the call processing structure 330 (e.g., outgoing trunk information, network routing information, overflow indicator.)

TABLE 3

| Routing Code | Network Routing Info | Outgoing Trunk Info | Overflow Indicator | OPSP |
|---|---|---|---|---|
| XXX | CdPN | | XXX-XXX* | 1-456-28X |

In the case where an entry is found in the routing table, the switching platform 210 populates the CdPN parameter and constructs the Forward GVNS parameter in the call processing structure 330. The switching platform 210 then routes the call to switching platform 220 via public facilities or dedicated facilities. If no match is found for the routing code in the routing table, the call is terminated.

It should, of course, be understood that while the present invention has been described in reference to a particular network configuration, different network configurations are possible. For example, the functional components of the present invention can physically reside across various elements in a communication network. Similarly, the functional components of the present invention can be integrated into a single network element.

What is claimed is:

1. A method for implementing intelligent telecommunication services in response to a source making a call request to a destination, within a telecommunication network, comprising the steps of:
(a) receiving, from the call request, a trigger parameter for suspending basic call processing and invoking service logic control;
(b) assigning a service-specific object driver based on the trigger parameter, the object driver dynamically invoking a plurality of predefined service objects each having service-specific instructions;
(c) building the object driver by invoking the plurality of service objects;
(d) formatting call processing information based on the object driver; and
(e) executing network management functions to detect error during said steps (a), (b), (c) and (d).

2. The method of claim 1, further comprising:
(f) forwarding the call request to a next switching platform based on call processing information.

3. The method of claim 1, wherein said executing step (e) monitors the plurality of service objects simultaneously.

4. The method of claim 1, wherein said executing step (e) includes recovering the object driver identified as not received by a management service object of said plurality of service objects.

5. The method of claim 3, wherein said executing step (e) monitors at least one of the plurality of service objects more than once.

6. The method of claim 3, wherein said executing step (e) includes generic network management of call recovery.

7. The method of claim 1, wherein said building step (c) interacts with said plurality of service objects simultaneously.

8. The method of claim 1, wherein the trigger parameter received in said step (a) is initiated by the source.

9. The method of claim 1, wherein the trigger parameter received in said step (a) is initiated by the network.

10. The method of claim 1, wherein said steps (a) through (e) are performed by a database.

11. The method of claim 1, wherein said steps (a) through (e) are performed by a plurality of network elements.

12. A system for implementing intelligent telecommunication services in response to a source making a call request to a destination, within a telecommunication network, comprising:
a switching platform connected within the network between the source and the destination, said switching platform receives, from the call request, a trigger parameter for suspending basic call processing and invoking service logic control, said switching platform assigns a service-specific object driver based on the trigger parameter, the object driver dynamically invoking a plurality of predefined service objects each having service-specific instructions, said switching platform formats call processing information based on the object driver, said switching platform executes network management functions to detect error; and
an adjunct platform connected to said switching platform, said adjunct platform builds the object driver by invoking the plurality of predefined service objects.

13. The system of claim 12, wherein said switching platform forwards the call request to a next switching platform based on call processing information.

14. The system of claim 12, wherein said switching platform recovers the object driver identified as not received by a management service object of said plurality of service objects.

15. The system of claim 12, wherein said switching platform monitors the plurality of service objects simultaneously.

16. The system of claim 12, wherein said switching platform monitors at least one of the plurality of service objects more than once.

17. The system of claim 12, wherein said switching platform includes generic network management of call recovery.

18. The system of claim 12, wherein said switching platform performs with said plurality of service objects simultaneously.

19. The system of claim 12, wherein the trigger parameter received by said switching platform is initiated by the source.

20. The system of claim 12, wherein the trigger parameter received by said switching platform is initiated by the network.

21. A system for implementing intelligent telecommunication services in response to a source making a call request to a destination, within a telecommunication network, comprising:
a switching platform connected within the network between the source and the destination, said switching platform receives a trigger parameter from the call request, said switching platform including:
a means for assigning a service-specific object driver based on the trigger parameter,
a means for formatting call processing information based on the object driver; and
a means for executing network management functions to detect error; and
an adjunct platform connected to said switching platform, said adjunct platform including a means for building the object driver by invoking a plurality of predefined service objects.

22. The system of claim 21, wherein said switching platform forwards the call request to a next switching platform based on call processing information.

23. The system of claim 21, wherein the plurality of service objects includes a management service object that recovers the object driver when identified as not received.

24. The system of claim 23, wherein the management service object monitors the plurality of service objects simultaneously.

25. The system of claim 23, wherein the management service object monitors at least one of the plurality of service objects more than once.

26. The system of claim 23, wherein the management service object performs generic network management of call recovery.

27. The system of claim 21, wherein said switching platform interacts with the plurality of service objects simultaneously.

28. The system of claim 21, wherein the trigger parameter received by said switching platform is initiated by the source.

29. The system of claim 21, wherein the trigger parameter received by said switching platform is initiated by the network.

* * * * *